Nov. 12, 1963  E. H. BAKER III  3,110,379
BICYCLE BRAKE

Filed March 11, 1959                      2 Sheets-Sheet 1

INVENTOR.
ELBERT H. BAKER III
BY Alfred C. Baly
ATTORNEY

INVENTOR.
ELBERT H. BAKER III
BY Alfred C. Body
ATTORNEY

United States Patent Office 3,110,379
Patented Nov. 12, 1963

3,110,379
BICYCLE BRAKE
Elbert H. Baker III, Cleveland, Ohio, assignor to Gregory Industries, Toledo, Ohio, a corporation of Ohio
Filed Mar. 11, 1959, Ser. No. 798,782
2 Claims. (Cl. 192—6)

This invention pertains to the art of bicycle brakes and more particularly to a bicycle brake of the coaster type.

In the art of bicycle coaster brakes, one of the principal problems has been the high cost of manufacture. This is brought on partially by the fact that bicycle coaster brakes were made up of a large number of individually machined parts, many of intricate shape and most of which required the removal of large amounts of metal to quite accurate tolerances.

Furthermore, the principal part, namely, the hub, had portions forming braking surfaces, portions forming bearing surfaces and portions with the spoke holes formed therein. The hub, after machining, had to be selectively coated or plated so that a subsequent carburizing process would harden only the braking and bearing surfaces while leaving the spoke hole portions in an unhardened state and then following the hardening process, the hub had to be again selectively plated or coated in order that a chrome plating operation would occur only on the outer surface of the hub.

The present invention contemplates a bicycle coaster brake which overcomes all of the above-referred to difficulties and others, and provides a coaster brake which is relatively cheap to manufacture and yet which will operate in a satisfactory manner.

In accordance with the present invention, the hub, instead of being machined as an integral piece from a solid block of metal, is instead, formed from a plurality of stampings each of which may be individually heat treated or chrome plated as the need requires without the necessity for selective coating or plating and then assembled into in effect a single unitary hub.

Further in accordance with the invention, the brake shoe for frictionally engaging the hub is so arranged as to be formed from a single stamping and is actuated by a cam member also so arranged as to be formed from a single stamping.

Further in accordance with the invention, the coaster brake is formed from a plurality of stampings having recesses adapted to receive completely assembled and enclosed bearing members whereby it is unnecessary to machine bearing surfaces on the stampings.

The principal object of the invention is the provision of a new and improved bicycle coaster brake which can be manufactured at a minimum cost.

A further object of the invention is the provision of a new and improved bicycle coaster brake which can be manufactured from assembled steel stampings.

Still another object of the invention is the provision of a new and improved bicycle coaster brake wherein the braking surface may be formed on a member separate and distinct from the member having the spoke holes formed therein whereby the need for selective hardening of the brake hub may be avoided.

Another object of the invention is the provision of a new and improved bicycle coaster brake wherein the brake shoes and associated holding member may be formed as a single unitary stamping.

Another object of the invention is the provision of a new and improved bicycle coaster brake wherein the clutching cone and the cam for actuating the brake shoes may be formed from a single unitary stamping.

The invention may take physical form in certain parts and arrangements of parts, the preferred embodiment of which will be described in detail in this specification and illustrated in the accompanying drawings which form a part hereof and wherein.

Figures 1, 2:
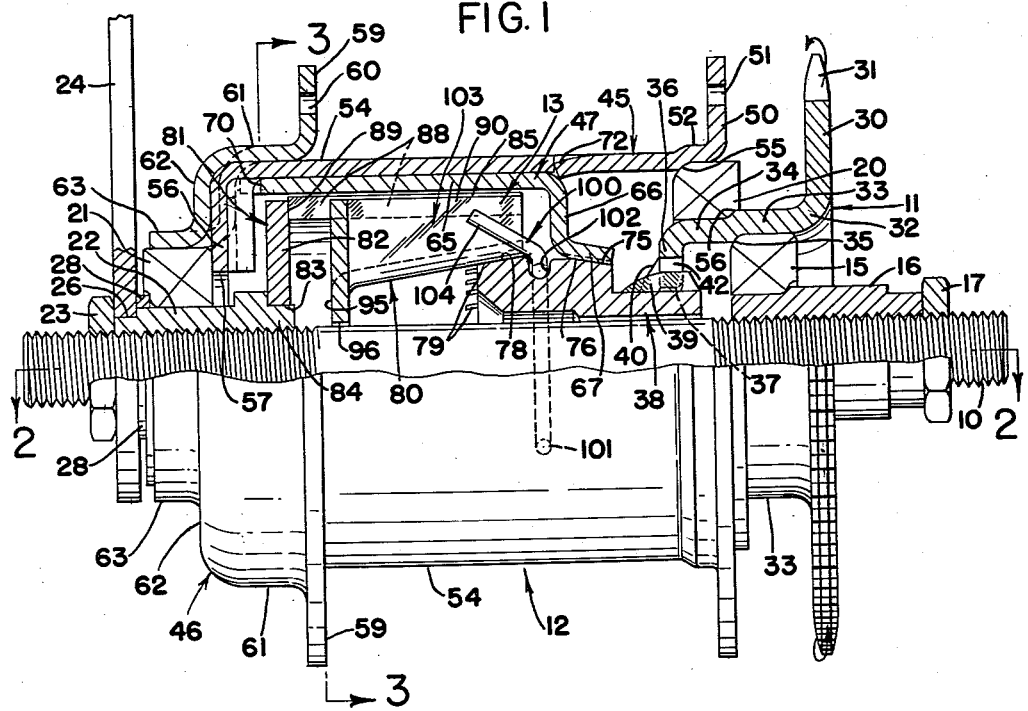
FIGURE 1 is a side cross-sectional view of a bicycle coaster brake illustrating a preferred embodiment of the invention.
FIGURE 2 is a cross-sectional view of FIGURE 1 taken approximately in the line 2—2 thereof.
Figure 3:
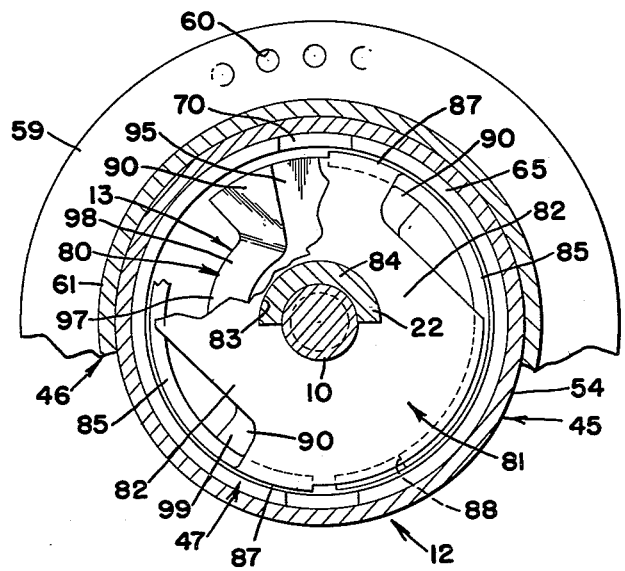
FIGURE 3 is a cross-sectional view of FIGURE 1 taken approximately in the line 3—3 thereof.
Figure 4:
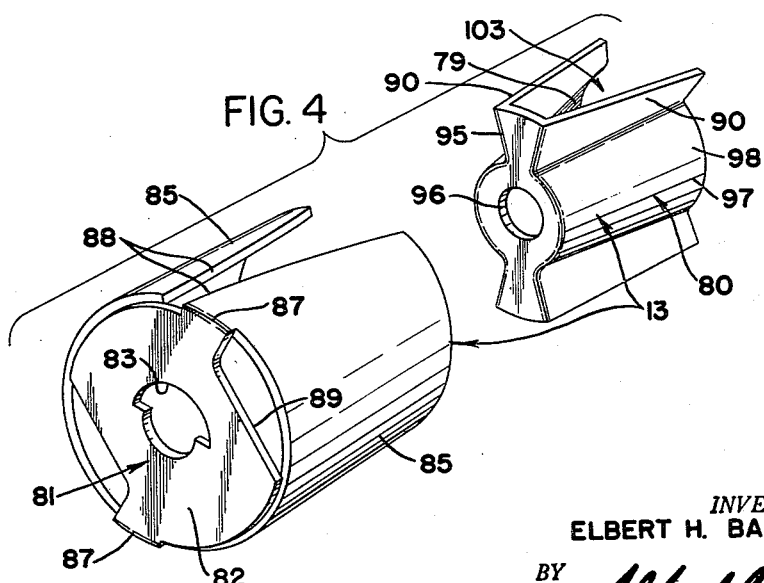
FIGURE 4 is an exploded detail view of the braking and cam assembly.

Referring now to the drawings wherein the showings are for the purposes of illustrating a preferred embodiment of the invention only and not for the purposes of limiting same, the figures show a bicycle coaster brake comprised of a supporting shaft 10 adapted to be mounted in the rear forks (not shown) of a bicycle as is conventional in the art and which supports in a manner as will be seen, a drive sprocket 11, a hub assembly indicated generally by the reference character 12 and a braking and cam assembly indicated generally by the reference character 13 and shown in detail in FIGURE 4.

The drive sprocket 11 is supported for rotation about the shaft 10 by means of a roller bearing 15 which in turn is supported on the shaft 10 by means of a stationary cone 16, the axial position of which may be adjusted and controlled by means of a nut 17 threadably engaged on the threads of the shaft 10.

The hub assembly 12 is supported for rotation on its right hand end by a roller bearing 20 which in turn is supported on the drive sprocket 11.

The opposite end of the hub assembly 12 is supported for rotation on a roller bearing 21 which in turn is supported on a stationary cone 22 which is threadably engaged on the left hand end of the shaft 10 and its position locked by means of a nut 23 threadably engaged with the left hand end of the threads of the shaft 10. A brake arm 24 is positioned between the nut 23 and the stationary cone 22 and its end (not shown) is adapted to be fastened to the bicycle frame as is conventional in the art. The brake arm 24 is positioned between the nut 23 and the stationary cone 22 and is interlocked with the cone 22 by means of a portion 26 and the cone 22 having a shape other than round extending into a similarly shaped opening in the arm 24. A spacing washer 28 is positioned between the arm 24 and the bearing 21.

The sprocket 11 is generally in the shape of a flanged cup having a uniform wall thickness throughout. The sprocket 11 is preferably formed from a sheet of metal, preferably steel, of the desired or required thickness so as to have a radial flange 30 having a plurality of sprocket teeth 31 on the outer edge and the inner edge extending in a gradual curve 32 to a cylindrical portion 33 into which the bearing 15 accurately fits. The cylindrical portion 33 terminates in a smaller cylindrical portion 34 to form a shoulder 35 between the two cylindrical portions which provides an axial stop for the bearing 15. The cylindrical portion 34 then terminates in a radially inwardly extending portion 36 having an opening 37 into which the right hand end of a drive screw 38 extends. The drive screw 38 is axially slidable on the shaft 10 and on its right hand cylindrical end, has an outer cylindrical surface with threads 39 formed thereon and the radial portion 36 of the sprocket 11 has recesses 42 forming portions 40 bent at an angle to form screw threads for coacting with the drive screw threads 39. It will thus be seen that as the drive sprocket 11 is rotated in opposite directions, the drive screw 38 will be axially moved on the shaft 10. The purpose of this axial movement will appear hereinafter.

The hub assembly 12 in the preferred embodiment of the invention is comprised of three portions, namely, an outer hub 45, an end hub 46, and an inner hub 47.

The outer hub 45 is generally in the shape of a flanged cup and reading from right to left includes a radial flange 50 having a plurality of axially extending spoke holes 51 adjacent to but spaced from its outer edge, and at its inner edge terminating in a short cylindrical portion 52, the inner surface of which accurately receives the outer peripheral surface of the bearing 20. Immediately to the left of the cylindrical portion 52, the outer hub 45 tapers abruptly inwardly to a further cylindrical portion 54 of a lesser diameter to provide a shoulder 55 forming a stop to locate the bearing 20 axially relative to the outer hub member 45.

It will be further noted that the drive sprocket 11 has a shoulder 55' opposite to the shoulder 35 which relatively locates the bearing 20 relative to the drive sprocket 11.

The cylindrical portion 54 of the outer hub 45 has a substantial axial length and the left hand end terminates in a radially inwardly extending flange 56 having an opening 57 through which the stationary cone freely extends. It will be noted that the bearing 21 bears against the left hand inner edge of the flange 56.

The outer hub 45 is also formed from a flat sheet of metal stamped to the shape shown. The method of manufacturing the outer hub 45 forms no part of the present invention.

The end hub 46, reading from right to left, includes a radial flange 59 which has adjacent to, but spaced from its radial outer edge, a plurality of spoke holes 60 and which at its inner edge terminates in a cylindrical portion 61 having an inner diameter such as to snugly fit over the outer diameter of the cylindrical portion 54 of the outer hub 45. The cylindrical portion 61 terminates in a radially inwardly extending flange 62 which in turn terminates in a left hand extending cylindrical portion 63, the inner surface of which has a dimension to accurately reieive the outer surface of the bearing 21. It will thus be noted that when the outer hub 45 and the end hub 46 are in assembled relationship, the entire hub assembly and drive sprocket 11 are mounted for rotation relative to each other and to the shaft end by means of bearings 15, 20 and 21.

The inner hub 47 in the embodiment of the invention shown, may be termed the braking hub, and reading from left to right, includes a cylindrical portion 65 which snugly fits into the inner diameter of the cylindrical portion 54 of the outer hub 45 and at its right hand end, terminates in a radially inwardly extending flange 66 which again at its inner end, terminates in a conical portion 67 which tapers in a right hand direction.

The inner hub 47 is preferably manufactured in a manner similar to that described for the other hub members by stamping from a sheet of metal such as steel. The inner surface of the cylindrical portion 65 of this inner hub 47 serves as the braking surface and will normally be hardened. Accordingly, preferably the inner hub 47 is formed from a material which is wear resistant and can preferably be hardened.

The spoke holes 51 and 60 are preferably circumferentially offset one from the other as is conventional in the art. Also, the spoke holes are uniformly spaced around the periphery of their respective flanges.

The various hub members 45, 46, 47 are all preferably fixed against relative rotation. While this may be accomplished in a number of different ways, such as by welding, riveting or peening, in the preferred embodiment of the invention, the left hand axial end of the hub 47 is provided with an axially extending notch 70 and after the members have all been assembled, the left hand surface of the end hub member 46 is peened or otherwise pressed so as to form an indentation in the flanges 56 and 62 to force a portion of the flange 56 into the notches 70 and a portion of flange 62 into flange 56.

In addition to this, the outer hub 45 is peened as at 72 adjacent to the right hand end of the inner hub 47 to lock the inner hub 47 against axial movement relative to the outer hub 45. Obviously, other means can be provided for locking the inner and outer hubs together.

The drive screw 38 is axially movable on the shaft 10 and moves to either the right or left depending upon the direction of force applied to the sprocket 11. Thus when the sprocket 11 is rotated in a direction to move the bicycle forward, the inner engaging screw threads 39 and 40 act to move the drive screw to the right. When the sprocket 11 has a force applied thereto so as to brake the bicycle, the inner engaging screw threads 39, 40 move the drive screw 38 to the left.

In the right hand position, the drive screw 38 has an outwardly facing right hand tapering surface 75 which engages an inwardly facing right hand tapering surface 76. The angle of taper of these two surfaces is preferably exactly 8½°. With this angle it has been found that the full torque applied to the sprocket 11 is transmitted between the surfaces 75, 76 without any slipping and yet the two surfaces freely disengage. If the angle of taper is 8° or less, there is a tendency for the two surfaces to lock to each other. If the angle is 10° or more, it is impossible to develop the desired and necessary frictional contact between the surfaces.

In the preferred embodiment of the invention, one of the surfaces, namely, the surface 76, is serrated to increase the frictional force developed.

The driving force on the sprocket 11 is thus transmitted through the drive screw 38 to the inner hub 47 and to the outer hub and end hub 45, 46 respectively to drive the bicycle wheel forward.

When the sprocket 11 is rotated in the opposite direction, the screw threads 39, 40 move the drive screw 38 in the opposite direction, that is, to the left. In this position the drive screw 38 has a leftwardly tapering outwardly facing surface 78 which engages an inwardly facing leftwardly tapering surface 79 formed on a cam member 80 which forms part of the braking assembly 13.

Thus in the preferred embodiment of the invention, the braking assembly 13 is comprised of the cam member 80 and a brake shoe member 81.

The brake shoe member 81 in the embodiment of the invention shown is comprised generally of a flat disc or washer portion 82 having a central opening 83 which is other than round, engaging a similarly shaped portion 84 on the stationary cone 22. The brake shoe member 81 is thus held against rotation, torque forces thereon being transferred to the stationary cone 22 and thence to the brake arm 24.

The brake shoe member also includes a pair of circumferentially extending brake shoes 85 each integral at one point indicated generally by the reference character 87 with the disc portion 82. The brake shoes 85 each have a pair of circumferentially facing cam surfaces 88 which diverge in a direction towards the right at an angle preferably exactly 34°. The left hand circumferential edge of each brake shoe 85 preferably engages or at most is slightly spaced from the left hand surface 89 on the disc 82.

Thus an axial force on the cam surface 88 will force the brake shoes 85 to expand in a radial direction.

The disc 82 is thus integral with the brake shoes 85 and performs the multiple function of holding the brake shoes 85 against rotation, positions them against axial movement, and anchors them in relative position to each other.

For the purpose of expanding the brake shoes 85, the cam member 80 has a pair of cam surfaces 90 which converge in a direction towards the left at an angle of exactly 34° and which cam surfaces 90 engage the cam surfaces 88 on the brake shoes 85.

The cam member 80 is specially shaped so that it can be formed from a single stamping from sheet steel. Thus the cam member 80 is comprised of a base 95 having a central opening 96 through which the shaft 10 passes. The member 89 has a pair of arms, each of which include a semi-conical portion 98 converging to the left at an angle of exactly 17° and flat edge portions forming the cam surfaces 90. The conical portions 98 have the serrations 79 formed on the inner right hand end thereof.

The cam member 80 is preferably formed from a single stamping from sheet steel to the shape shown and as a result has generally a uniform wall thickness over all. It will be appreciated that this member could be formed by other methods, but at a slightly higher cost.

Means are also provided for preventing rotation of the drive screw 38 under the turning effect of the sprocket 11. In the embodiment of the invention shown, a drag spring 100 is provided which has a circular portion 101 which fits into a corresponding groove 102 in the outer surface of the drive screw 38. This spring 100 also includes a radial and angular portion 104 which extends into the space 103 between the radial portions 99. This spring end 104 engages the cam 80 and prevents all but a limited circumferential or rotating movement of the drive screw 38. Obviously, other means could be provided for resisting rotation of the drive screw 38 in relation to sprocket 11.

The bearings 15, 20 and 21 are preferably of a type standard on the market which include the inner and outer ball races and dust and dirt sealing protective means all integral therewith. With this arrangement it is possible to form the sprocket 11, the outer hub 45 and the end hub 46 with surfaces which have a dimensional tolerance but which need not be machined to high finishes.

It will be appreciated that in accordance with the invention, the drive sprocket 11, the various hubs 45, 46 and 47, the cam 80 and the brake shoe member 81 can all be formed by simple and known stamping operations from single sheets of steel or the like with a minimum of scrap material produced and a minimum of labor. Furthermore, the parts after the stamping operation, require a minimum of machining operations and thus the entire coaster brake assembly can be produced at a minimum cost.

The invention has been described with reference to preferred embodiments. Obviously, modifications and alterations will occur to others upon a reading and understanding of this specification, and it is my intention to include all such modifications and alterations insofar as they come within the scope of the appended claims.

Having thus described my invention, I claim:

1. In a bicycle coaster brake, including a shaft, a sprocket journaled on the shaft, a drive screw actuated by said sprocket, and a hub journaled on one end on said sprocket and on the other end on said shaft, said hub including an outer cylindrical member having a pair of radially extending flanges with spoke holes formed therein, the improvement which comprises: said hub including a brake member formed from a metal stamping on the inside of said outer member and fixed against rotation relative thereto, said brake member having a hardened braking surface and also including a tapered surface adapted to be drivingly engaged by said drive screw.

2. As an article of manufacture, a sprocket for a bicycle coaster brake including a radial flange having sprocket teeth formed on the outer edge thereof, a cylindrical portion extending axially from the inner edge of said radial flange and having inner and outer surfaces for co-acting with bearings and a second radial flange extending inwardly from the end of said cylindrical portion remote from said first-mentioned flange and having an opening therethrough, the edge of said opening having threads formed therein, said sprocket having a generally uniform wall thickness from the outer edge of said first-mentioned flange to the edge of said opening.

References Cited in the file of this patent

UNITED STATES PATENTS

| | | |
|---|---|---|
| 645,246 | Busler | Mar. 13, 1900 |
| 708,201 | Case | Sept. 2, 1902 |
| 773,333 | Morrow | Oct. 25, 1904 |
| 908,455 | Ellett | Jan. 5, 1909 |
| 1,023,347 | Whittington | Apr. 16, 1912 |
| 2,189,956 | Kurzina | Feb. 13, 1940 |
| 2,572,182 | Mueller | Oct. 23, 1951 |
| 2,837,187 | Hood | June 3, 1958 |
| 2,854,857 | Gleasman et al. | Oct. 7, 1958 |
| 2,892,521 | Spencer | June 30, 1959 |
| 2,985,269 | Gleasman | May 23, 1961 |